United States Patent [19]

Jahnel

[11] 4,442,728
[45] Apr. 17, 1984

[54] CLUTCHED MULTIPLE BRANCH GEAR TRANSMISSION SYSTEM AND METHOD

[75] Inventor: Ernst Jahnel, Augsburg, Fed. Rep. of Germany

[73] Assignee: Zahnraderfabrik Renk A.G., Augsburg, Fed. Rep. of Germany

[21] Appl. No.: 276,199

[22] Filed: Jun. 22, 1981

[30] Foreign Application Priority Data

Jun. 21, 1980 [DE] Fed. Rep. of Germany ....... 3023283

[51] Int. Cl.³ ............................................. F16H 3/14
[52] U.S. Cl. ...................................... 74/361; 74/410; 74/339; 192/48.7
[58] Field of Search ................. 74/339, 355, 356, 361, 74/410; 192/48.7, 48.8

[56] References Cited

U.S. PATENT DOCUMENTS

| | | | |
|---|---|---|---|
| 1,151,762 | 8/1915 | Day | 74/410 |
| 1,165,019 | 12/1915 | Pedersen | 74/361 |
| 1,459,964 | 6/1923 | Alquist | 74/410 |
| 1,515,869 | 11/1924 | Moyer | 74/361 |
| 2,248,219 | 7/1941 | Day | 74/410 |
| 2,337,501 | 12/1943 | Schmidt | 74/410 |
| 2,386,367 | 10/1945 | Taylor | 74/801 X |
| 2,687,045 | 8/1954 | Schroeder | 74/410 |
| 2,911,845 | 11/1959 | North | 74/410 |
| 2,943,504 | 7/1960 | Falk et al. | 74/361 |
| 2,982,144 | 5/1961 | Wallgren | 74/410 |
| 3,003,606 | 10/1961 | Hindmarch | 192/48.8 |
| 3,888,337 | 6/1975 | Worthen et al. | 74/361 |

Primary Examiner—Allan D. Herrmann
Assistant Examiner—Joseph M. Rolnicki
Attorney, Agent, or Firm—Natter & Natter

[57] ABSTRACT

A transmission includes multiple lay shaft branches driven by gearing on an input shaft. Each lay shaft branch engages a common output gear and includes a clutch. The input shaft is journalled within a hydraulically adjustable bearing which controls input shaft displacement. When friction clutches are employed in the branches, maximum input shaft displacement is provided after clutch engagement to compensate for different frictional forces in each clutch. If positive locking clutches are employed in the branches, maximum input shaft displacement is permitted prior to engagement of the second clutch to provide synchronism between the primary and secondary components of the second clutch. In one embodiment, the adjustable bearing comprises a thrust bearing which permits axial movement of the input shaft while the input shaft gearing comprises helical ring gears having opposite slope. An alternate embodiment encompasses a single drive gear on the input shaft with the bearing being adjustable to permit transverse displacement of the input shaft axis for movement into planes parallel to a common plane of the branch axes.

16 Claims, 7 Drawing Figures

CLUTCHED MULTIPLE BRANCH GEAR TRANSMISSION SYSTEM AND METHOD

BACKGROUND OF THE INVENTION

1. Field of the Invention

The present invention relates generally to transmissions having multiple lay shaft branches for driving a common output gear and more specifically to a system and method for improved operation when clutches are employed in the branches.

2. Brief Description of the Prior Art

Transmissions having an input shaft which drives multiple lay shaft branches with each branch, in turn, including a pinion driving a common output gear have been frequently employed for the purpose of distributing a load through the plurality of gear trains. Typical of such gearing systems is the gearing system disclosed in U.S. Pat. No. 2,386,367.

Transmissions of this type have been employed to drive bowl mill mixers with the input shaft including a double helical pinion. The double helical pinion engaged a single helical gear on each lay shaft and the lay shaft pinions engaged an output gear. If the helical portions of the double helical input pinion had opposite slope and the same lead and if the double helical input pinion was permitted to move axially, the load distribution was equally divided between each of the helical portions of the input pinion and each lay shaft. In such operating state, the axial position of the input pinion was determined by the engagement with the driven gears of the lay shafts. The lay shafts were synchronized by the engagement of the lay shaft pinions with the output gear.

In some applications, such as in marine systems, it was necessary to provide shiftable clutches within the lay shaft branches between the gears driven by the input pinion and the pinions engaging the output gear. Shiftable clutches were also necessary to obtain reversibility of the direction of rotation of the output gear. In such instances, it was necessary to provide additional lay shafts so that some lay shafts were rotating in opposite directions. Shiftable clutches were employed in a disengaged position in the lay shafts which rotated in the direction opposite to that of the lay shafts driving the output gear. A typical example of a transmission gearing having lay shaft branches and reversing capabilities is illustrated in U.S. Pat. No. 1,151,762.

Unfortunately, when shiftable clutches were employed in the lay shaft branches, the advantages of equal load distribution between the branches as a result of an axially freely movable opposite double helical drive pinion were forfeited. Examples of transmissions employing shiftable clutches were illustrated and described in the journal *MTZ Motortechnische Zietschrift* 38 (1977) 11 at page 505 (FIGS. 8 and 9) which disclosed reversing gear systems for ships.

In one system shown (FIG. 8), herringbone spur gears were employed on the lay shafts in engagement with a herringbone drive pinion. Thus, the drive pinion was not axially movable. As a result, when the clutches were in engagement, each of the lay shaft branches bore different loadings due to the different frictional characteristics of each clutch.

In a second ship reversing gear system described in the journal (FIG. 9), an input drive pinion with single helical teeth was illustrated. The drive pinion engaged two spur gears, each fixed to a lay shaft. The axial forces due to engagement of the helical teeth were restrained by thrust bearings. The system did not permit equal torque distribution through axial movement of the input pinion. Unequal torque distribution over the two lay shafts resulted.

The problems encountered with the employment of frictional clutches or slip clutches resulted because at the end of the slip phase of each clutch the clutch reached its synchronous state at a torque which was dependent upon its frictional characteristics. The load distribution through each lay shaft branch thus depended upon the frictional characteristics of the clutch. With the input pinion axially fixed and the transmission operating at full speed with the frictional clutches engaged, different load distributions and different load tensions resulted in each of the lay shafts.

A similar transmission system employing form locking clutches such as gear or claw clutches was illustrated in the journal *MTZ Motortechnische Zietschrift* 38 (1977) 11 at page 506 (FIGS. 11 and 12). Normally, the clutching operation with gear or jaw clutches could only be performed when the input shaft was stopped or rotated very slowly since position synchronism between the primary and secondary parts of such clutches was a prerequisite to engagement.

SUMMARY OF THE INVENTION

A clutched transmission includes an input shaft driving an input pinion with the input pinion engaging at least a pair of gears on lay shafts. Each lay shaft carries an output pinion with the output pinions driving a common output gear. Each lay shaft further includes a shiftable clutch.

To provide for equal torque distribution between the lay shafts, the input shaft is journalled within an adjustable thrust bearing. Increased axial play is provided in the adjustable bearing to permit axial displacement of the input pinion when the transmission is at its full operating state with the friction clutches engaged.

If the input pinion comprises a double helical gear, a single helical portion of each gear engages a mating single helical gear on the lay shaft. With increased axial play in the thrust bearing, the double helical drive pinion moves axially to equalize torques in the lay shafts, thereby compensating for different frictional characteristics in the clutches. Axial play in the adjustable thrust bearing is reduced when the friction clutches are disengaged and during the slip phase of the clutches.

If gear or claw type clutches are employed, increased axial play is provided after one of the clutches is engaged and during engagement of the second clutch. Such increased axial play is provided during the clutching phase to assure synchronous positions of the primary and secondary parts of the locking clutch. The thrust bearing will operate at reduced, i.e. normal, axial play when the clutches are disengaged.

From the foregoing compendium, it will be appreciated that it is an object of the present invention to provide a clutched multiple branch gear transmission of the general character described which is not subject to the disadvantages of the prior art as aforementioned.

It is a further object of the present invention to provide a clutched multiple branch gear transmission of the general character described which provides equal torque and load distribution between the branches.

A further object of the present invention is to provide a clutched multiple branch gear transmission of the general character described which provides efficient economical power distribution.

Yet another object of the present invention is to provide a clutched multiple branch gear transmission of the general character described which is well suited to meet the conditions of practical usage.

A further object of the present invention is to provide a clutched multiple branch gear transmission of the general character described which includes an axially movable drive pinion for equalizing load distributions among a plurality of lay shafts having frictional clutches.

Another object of the present invention is to provide a clutched multiple branch gear transmission of the general character described which includes a plurality of lay shafts having form locking clutches and with a common driving pinion being displaceable to permit position synchronization of clutch components during engagement.

A still further object of the present invention is to provide a method of equalizing torques in branches of a multiple branch gear transmission of the general character described having a plurality of lay shafts with clutches positioned on the lay shafts.

Another object of the present invention is to provide a method of engaging form locking clutches in a multiple branch gear transmission of the general character described.

Other objects of the present invention in part will be obvious and in part will be pointed out hereinafter.

With these ends in view, the invention finds embodiment in certain combinations of elements, series of steps and arrangements of parts by which the said objects and certain other objects are hereinafter attained, all with reference to the accompanying drawings and the scope of which will be more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENT

Figure 1:
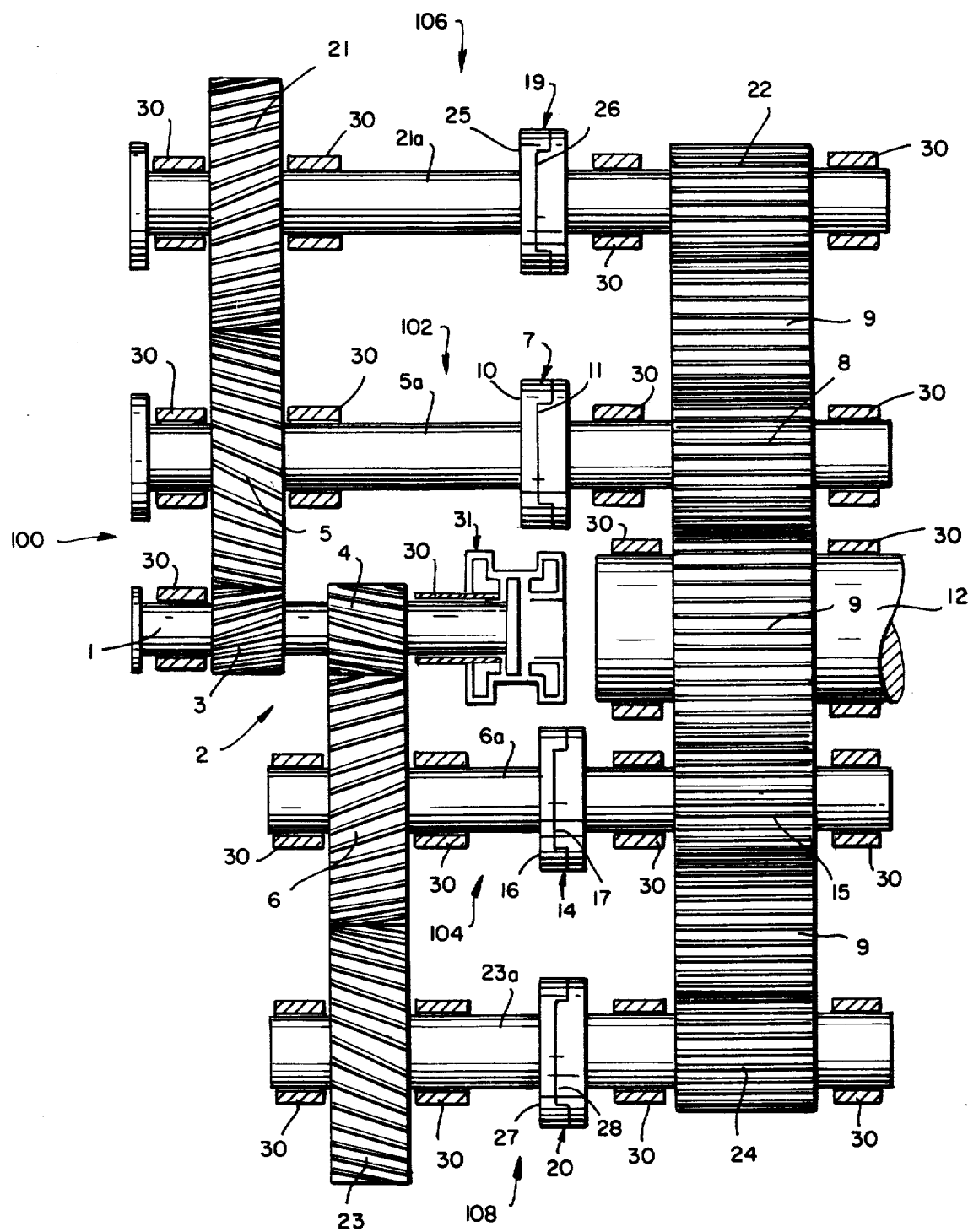
FIG. 1 is a schematized representation of a clutched multiple branch reversing marine transmission constructed in accordance with and embodying the invention and having an adjustable axial thrust bearing within which an input shaft is journalled.
Figure 1A:
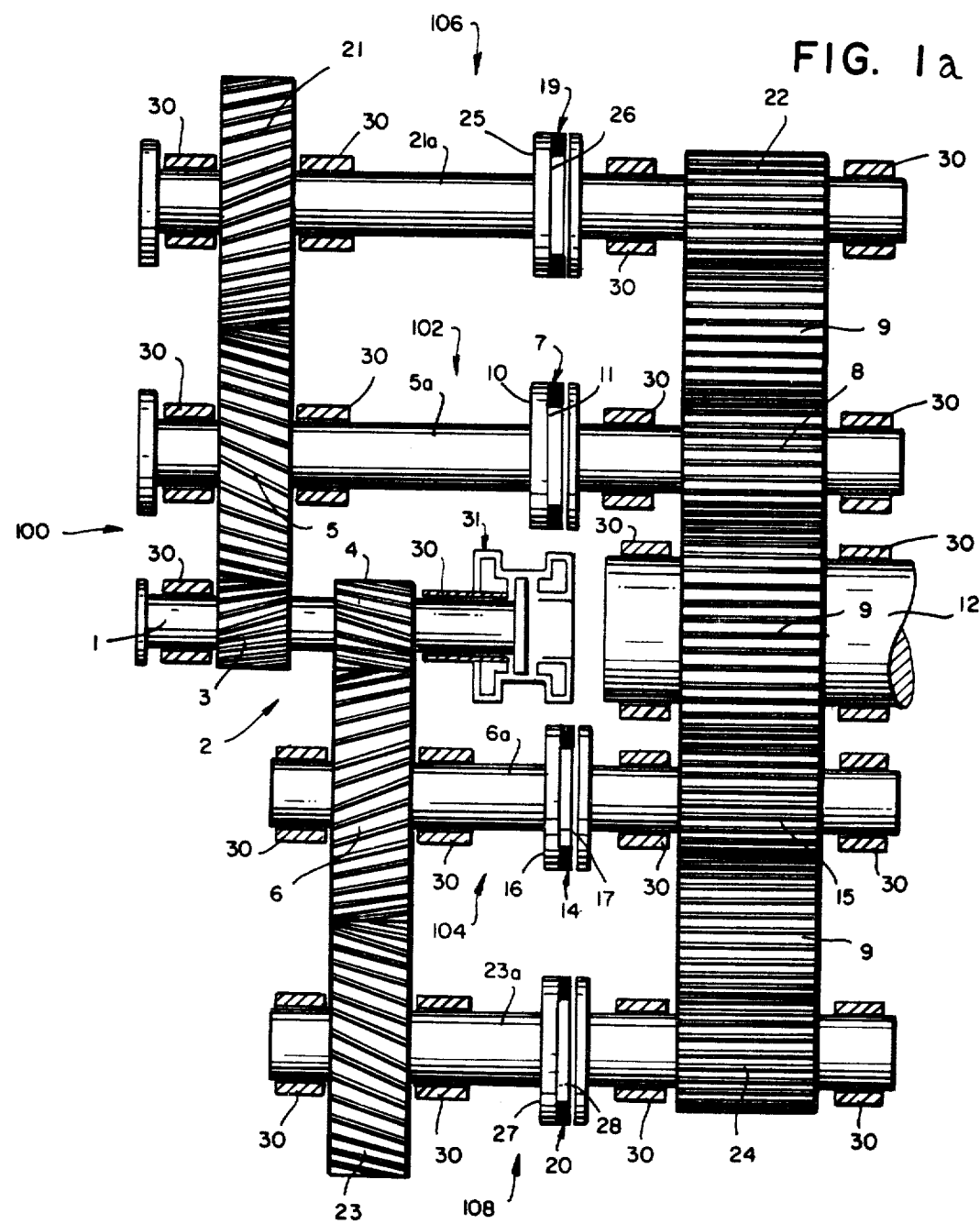
FIG. 1a is a further representation of the transmission wherein friction clutches are in the multiple branches.
Figure 3A:
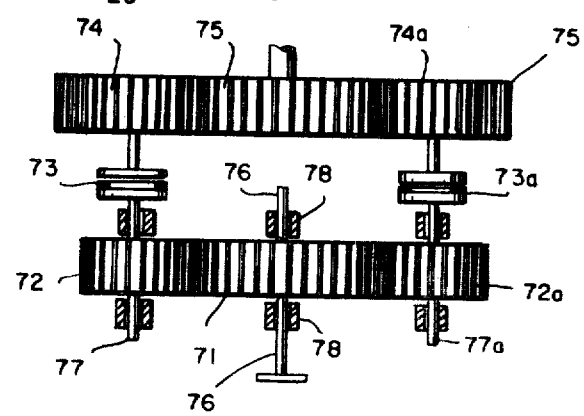
FIG. 3a is a further representation of the embodiment of FIG. 3 wherein friction clutches are shown.

Referring now in detail to the drawings, the reference numeral 100 denotes generally a clutched multiple lay shaft reversing marine transmission constructed in accordance with and embodying the present invention. Transmission 100 includes an input or drive shaft 1 having a drive pinion 2. The pinion 2 comprises a pair of oppositely sloped helical ring gears 3, 4 spaced from one another. The drive pinion 2 thus comprises a double helical pinion which, in accordance with the invention, drives a pair of lay shafts.

Accordingly, the ring gear 3 meshes with a single helical spur gear 5 which is fixed to a lay shaft 5a, while the helical ring gear 4 meshes with a single helical spur gear 6 fixed to a lay shaft 6a. The lay shaft 5a, in turn, drives a pinion 8 through a shiftable clutch 7. The lay shaft gears 5 and 8, together with its intermediate shiftable clutch 7, can be considered as a single gear train denoted 102 which drives a transmission output gear 9 fixed to an output shaft 12. The primary part of the gear train 102 comprises the single helical spur gear 5, the lay shaft 5a and a primary plate 10 of the clutch 7, while the secondary part of the gear train 102 comprises a driven clutch plate 11 which engages a secondary segment of the lay shaft 5a and the pinion 8 fixed thereto.

A further gear train 104 is formed by the single helical spur gear 6, its lay shaft 6a, a shiftable friction clutch 14 and a pinion 15 which drives the output gear 9. The primary portion of the gear train 104 includes the helical spur gear 6, its lay shaft 6a and a primary plate 16 of the clutch 14. The secondary portion of the gear train 104 comprises a driven clutch plate 17 which engages a secondary segment of the lay shaft 6a and the pinion 15. With the input shaft 1 rotating in one direction, the lay shaft gear trains 102 and 104 synchronously drive the output gear 9 in a given direction of rotation. The input shaft, both of the lay shafts 5a and 6a, and the output shaft 12 are all journalled within bearings denoted generally by the reference numeral 30.

In order to selectively drive the output gear 9 in an opposite direction with the input shaft 1 maintaining the same direction of rotation, a pair of lay shaft reversing gear trains 106, 108 are provided. The reversing gear train 106 includes an intermediate friction clutch 19, while the reversing gear train 108 includes a friction clutch 20.

The reversing train 106 is driven by the spur gear 5 of the train 102 which meshes with a further single helical spur gear 21 fixed to a lay shaft 21a. The lay shaft 21a drives an output pinion 22 which is in meshing engagement with the transmission output gear 9. The primary part of the reversing gear train 106 includes the spur gear 21, a primary part of the lay shaft 21a, and a primary plate 25 of the clutch 19; the secondary part of the reversing gear train 106 includes a driven clutch plate 26 which, in turn, drives the output pinion 22 through a secondary part of the lay shaft 21a.

Similarly, the reversing gear train 108 includes a single helical spur gear 23 in engagement with the spur gear 6. The spur gear 23 is fixed to a lay shaft 23a which carries the clutch 20 having a primary plate 27 and a driven plate 28 and drives a reversing output pinion 24 in engagement with the output gear 9.

Figure 2:
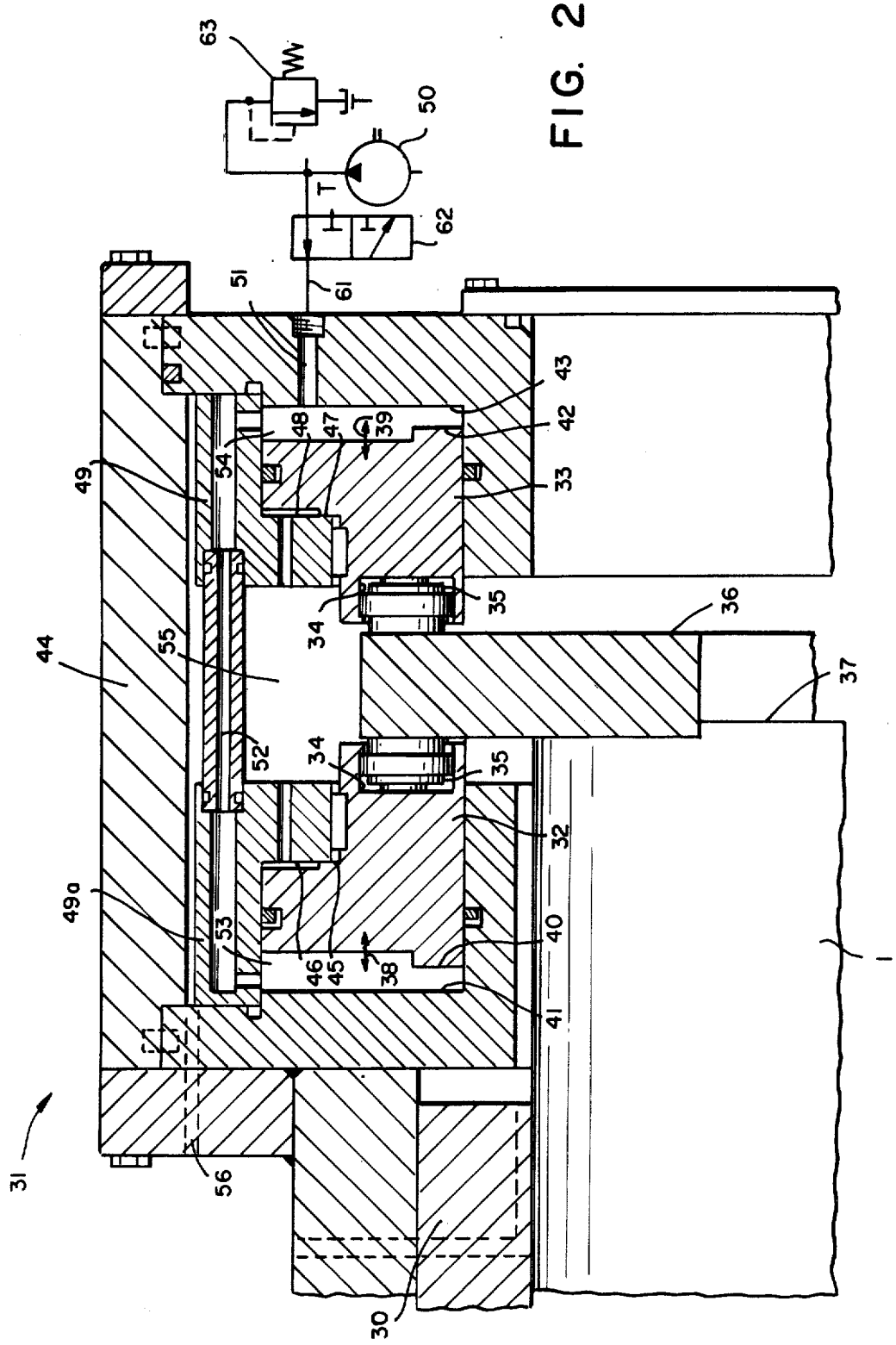
FIG. 2 is an enlarged fragmentary longitudinal sectional view through the adjustable bearing which is controlled to selectively permit increased axial movement of the input shaft and a double helical pinion fixed thereto.

In accordance with the present invention, in addition to the bearings 30 within which the input shaft 1 is journalled, an adjustable thrust bearing 31 is employed to permit axial displacement of the input shaft 1 and the double helical drive pinion 2 relative to the single helical spur gears 5 and 6. Referring now in detail to FIG. 2 wherein the adjustable bearing is depicted, it will be seen that the bearing 31 includes a pair of annular pistons 32, 33, each having an annular groove 34 which carries a slide bearing 35. The slide bearings 35, in turn, engage a slide bearing annulus 36 fixed to an end 37 of the input shaft 1. Alternately, roller bearings may be employed.

The pistons 32, 33 are mounted within annular chambers 53, 54, respectively, formed in a bearing box 44. The piston 32 is movable in the directions indicated by the heavy arrow 38 from a position indicated in FIG. 2 to a position wherein a piston stop 40 contacts an internal chamber wall 41. Similarly, the piston 33 is movable in the directions indicated by the heavy arrow 39 from the position indicated in FIG. 2 to a position wherein a stop 42 contacts an internal chamber wall 43.

In the position illustrated in FIG. 2, a minimal amount of axial play is provided for the input shaft 1. Such position of the piston 32 is determined by contact between a piston stop 45 and an abutment 46 formed on a spacer 49a. Similarly, the position of the piston 33 as illustrated in FIG. 2 is fixed by contact between an abutment 48 formed on a spacer 49 and a piston stop 47 of the piston 33.

The pistons 32, 33 are controlled to provide a minimal amount of axial play for the input shaft 1 as depicted in FIG. 2 through the application of hydraulic pressure from an external pressure source or pump 50 with hydraulic fluid extending through a feed line 61 and a bore 51 of the bearing block 44 into the chamber 54 within which the piston 33 is carried. From the chamber 54, fluid extends through a passageway formed in the spacer 49 and a bridge fluid line 52 which extends between the spacer 49 and the spacer 49a. From the line 52, fluid extends through the spacer 49a and into the chamber 53 within which the piston 32 is movable.

To provide the least amount of axial play, fluid pressure is applied through the lines and passageways into the chambers 53 and 54. When hydraulic pressure is relieved from the chambers 53, 54, axial forces on the input shaft 1 as generated by engagement between the double helical drive pinion 2 and the single helical spur gears 5 and 6 will be sufficient to move the bearing pistons 32 and 33 apart with the force being applied through the slide bearing annulus 36 and the slide bearings 35. This will result in an appropriate amount of axial play which would correspond to the operating play or operating distance of the system.

A venting chamber 55 is provided in the bearing box 44 between the pistons 32, 33, and a suitable vent bore 56 is provided for atmospheric access to the chamber 55.

A two-position three-way hydraulic control valve 62 is provided in the hydraulic feed line 61. In addition, a pressure relief valve 63 is interconnected to the feed line 61. The valve 62 is operable to interconnect the chambers 53, 54 with the hydraulic pressure source 50 or to selectively relieve pressure from the chambers. The pressure relief valve 63 is desirable for the purpose of preventing excessive pressure build-up at the outlet of the pressure source 50 when the valve 62 is being switched.

The pistons 32, 33 are in the position illustrated in FIG. 2 in instances wherein the clutches 7, 14, 19 and 20 are disengaged with the transmission at idle under no load and, in addition, when the clutches of the forward drive trains 102, 104 or the reverse drive trains 106, 108 are slipping during a clutching operation. To provide the piston positions as illustrated in FIGS. 2, pressurized hydraulic fluid is introduced into the chambers 53, 54, forcing the pistons toward one another and reducing the distance between the pistons to a minimum distance determined by abutment between the piston stops 45, 47 and the spacer abutment surfaces 46, 48. In such position, the primary components of the gear trains 102, 104, 106 and 108 are forced to run in absolute synchronism and the minimal axial play existent in the adjustable bearing 31 is considered as normal axial play.

In order to operate the transmission with the thrust bearing 31 having greater axial play, the pressure source or pump 50 is shut off and the fluid supply switched at the valve 62 to a pressureless state. One of the two bearing pistons 32, 33 is moved axially into a position wherein the input shaft 1 is free of axial restraintive forces. Such movement is accomplished by any existent axial forces in the input shaft itself. Once uniform load distribution in all of the gear trains is achieved, there will no longer be any axial forces on the input shaft.

It should be appreciated that the axially unrestrained position of the piston 32 or 33, hence axially unrestrained position of the input shaft 1, is desirably achieved prior to abutment between the piston stops 40, 42 and the chamber walls 41, 43. The chambers 53, 54 are again pressurized with the introduction of hydraulic fluid when the friction clutches are to be disengaged.

It should be understood that, in accordance with the method of the present invention, if the shiftable clutches 7, 14, 19 and 20 are frictional clutches the least or "normal" axial play for the input shaft 1 (as shown in FIG. 2) is provided whenever the clutches are disengaged and during the slipping phase when engaging the friction clutches. Greater axial play is provided when the friction clutches 7, 14 are engaged for output gear operation in one direction (with the clutches 19, 20 disengaged) or when the friction clutches 19, 20 are engaged for operation of the transmission in the opposite direction (with the clutches 7, 14 disengaged). Of course, at any time, either the friction clutches of the forward gear trains 102, 104 or the friction clutches of the reversing gear trains 106, 108 are engaged. Conditions will exist when all clutches are simultaneously disengaged.

The reason for providing the greater axial play when friction clutches are engaged is that at the end of the slipping phase of clutch engagement, friction clutches transmit different torques because of unavoidable coefficient or friction tolerances which results in torque oscillations. As a result, the load distribution to the single helical spur gears 5 and 6 is uneven which results in axial stress on the adjustable thrust bearing 31.

By increasing the axial play of the thrust bearing 31 so that the input shaft 1 can move axially to positions wherein the double helical pinion 2 is free of axial forces, uniform load distribution to the spur gear 5 and 6 is established. The amount of increase in the play of the adjustable thrust bearing 31 is a function of the different elastic distortions present at the end of the slipping phase of whichever sets of friction clutches are engaged, i.e. the clutches 7 and 14 or the clutches 19 and 20.

With friction clutches, the control valve 62 is employed to relieve pressure from the chambers of the thrust bearing 31 and provide increased axial play only after the end of the slipping phase of the friction clutches being engaged.

It will thus be seen that it is a principal aspect of the invention to employ different bearing plays for different operating states of a clutched multiple lay shaft transmission in order to generate torques of equal magnitudes in all gear trains.

As previously mentioned, in lieu of friction clutches, form or positive locking clutches such as gear or claw clutches may be employed in the transmission 100. When employing form locking clutches, the transmission function cycle is similar to that as above described with respect to friction clutches. Form locking clutches positioned within parallel lay shafts cannot be simultaneously engaged due to tolerance differences. As a result, only one of the form locking clutches will be engaged initially, while the other clutch is maintained in a disengaged position.

Once one form locking clutch is engaged, e.g. the clutch 7, the primary and secondary parts of the second clutch, e.g. the clutch 14, will be maintained in speed synchronization. For engagement, however, position synchronization of the primary and secondary clutch parts is necessary. Such position synchronization is achieved by relative rotation of the primary and secondary clutch parts resulting from axial movement of the input shaft and the helical engagement of a spur gear and the input pinion. This movement results when increased bearing play is provided.

In accordance with the invention, the axial play of the adjustable bearing 31 is increased from the normal or minimal play employed when the form locking clutches are disengaged and during engagement of the first form locking clutch to the maximum play during and after engagement of the second locking clutch.

Figure 3:
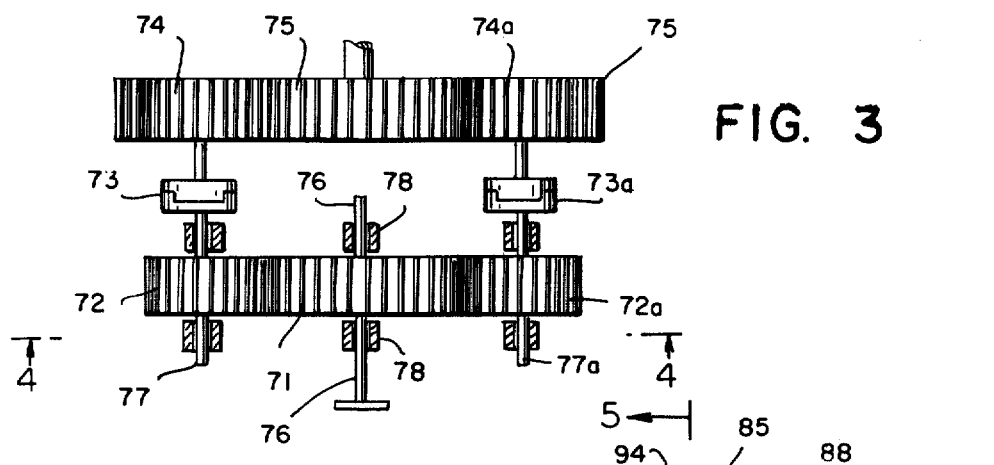
FIG. 3 is a schematized representation of an alternate embodiment of the invention without reversing gears and wherein the input shaft bearings are adjustable to permit vertical displacement of the input shaft axis and its drive pinion relative to the axes of lay shafts which carry spur gears driven by the input pinion.
Figure 4:
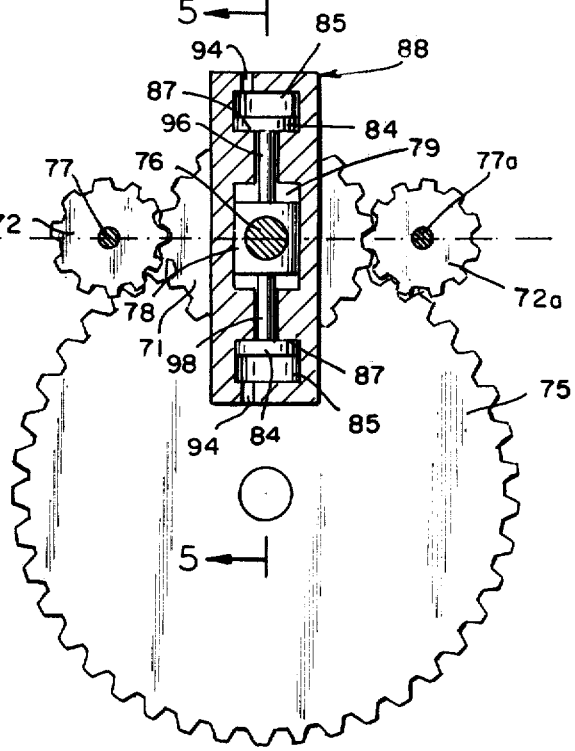
FIG. 4 is an enlarged scale sectional elevational view through the input shaft and the adjustable bearing taken substantially along line 4—4 of FIG. 3 and showing a bearing housing.
Figure 5:
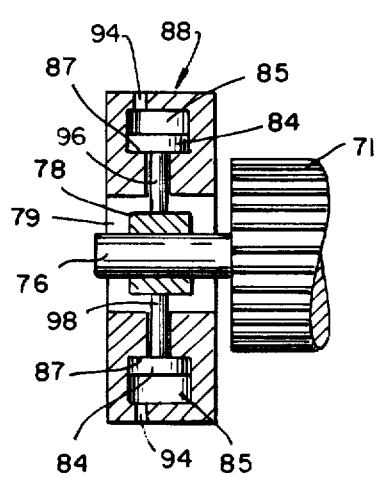
FIG. 5 is a further sectional view through the adjustable bearing, the same being taken substantially along line 5—5 of FIG. 4 and showing a pair of hydraulic cylinders operable to constrain the input shaft against vertical movement or permit such movement within the confines of the housing.

Referring now to FIGS. 3, 4 and 5 wherein an alternate embodiment of the invention is illustrated, there is shown a multiple lay shaft transmission having a clutch in each lay shaft similar to that of the embodiment previously described and without reversing gears. The transmission includes an input shaft 76 having a drive pinion 71 which engages a pair of spur gears 72, 72a, respectively. The spur gear 72 is fixed to a lay shaft 77, while the spur gear 72a is fixed to a lay shaft 77a.

The lay shaft 77 drives a pinion 74 through a shiftable clutch 73 while the lay shaft 77a drives a pinion 74a through a shiftable clutch 73a. The pinions 74, 74a mutually engage and drive a transmission output gear 75.

From an examination of FIG. 4, it will be observed that the lay shafts 77 and 77a lie within a substantially horizontal plane denoted by the reference numeral 80. In addition, the input shaft 76 which carries the drive pinion 71 also is shown to lie within the plane 80. As shown in FIG. 3, the lay shafts 77, 77a extend along axes parallel to the axis of the input shaft 76.

In accordance with the present invention, the input shaft 76 is journalled within a pair of adjustable bearings 78. One of the adjustable bearings 78 is positioned on each side of the drive pinion 71. Each bearing 78 is adjustable for the purpose of selectively permitting movement of the input shaft 76 and the drive pinion 71 relative to the lay shafts 77, 77a and their spur gears 72, 72a.

The bearings 78 include a cylindrical bore within which the input shaft 76 is journalled and with the bearing itself being slidably positioned within an appropriate aperture 79 formed in a bearing block 88. The bearing block 88 includes a pair of cylinders 85, one positioned above and one positioned beneath the aperture 79 and with each of the cylinders being accessed by a suitable passageway 94 for the introduction of hydraulic fluid.

A piston 84 is slidably carried in each cylinder 85. Between one of the pistons 84 and the top of the bearing 78 extends a rigid link 96. The link 96 may be fixed to the piston. A further link 98 fixed to the lower piston 84 extends to the bottom of the bearing 78.

When it is desired to maintain the input shaft 76 within the common plane 80, pressurized fluid is introduced to both cylinders 85 of each bearing block 88 through the apertures 94. The input shaft 76 and its pinion 71 will rotate without movement of its axis relative to the plane of the axes of the lay shafts 77, 77a.

When it is desired to permit movement of the input shaft 76 and its pinion 71, pressure is relieved from the cylinders 85 and the input shaft 76 will be permitted to move vertically as viewed in FIG. 4. Naturally, the maximum piston stroke permitted by the configuration of the cylinders 85 and the aperture 79 in the bearing block 88 will be greater than the maximum travel to be expected in actual operation of the transmission 200.

In instances wherein the pressure is relieved from the cylinders 85, the final position of the input shaft 76 will be a function of the meshing of the input pinion 71 with the spur gear 72, 72a as constrained by the bearing block aperture side walls and the piston travel path. Since the adjustable bearings 78 are positioned on opposite sides of the input pinion 71, the input shaft 76 will always be maintained parallel to the lay shafts 77, 77a; however when the cylinders are not pressurized, the input shaft axis may lie in a plane other than the plane of the lay shaft axes.

When the input shaft 76 moves into a different plane, that is shifts from its initial position shown in FIGS. 4 and 5 with zero bearing play into an operating position with increased bearing play, a slight unevenness in tooth engaging forces between the input pinion 71 and the lay shaft spur gears 72, 72a will result. In actuality, the input shaft shifts slightly and the consequent difference in tooth engagement do not result in a deleterious effect upon power distribution.

By relieving the fluid pressure applied to the cylinders 85, the adjustable bearing 78 will be provided with increased play and will move vertically (as viewed in FIG. 4). The tooth forces acting upon the spur gears 72, 72a due to engagement with the driving input pinion 71 will be equalized if the weight of the drive pinion 71 is not considered. As a result, uniform torque distribution is provided and the torque load is equally shared between the pinions 72 and 72a. The effect of the weight of the input pinion 71 upon tooth engagement forces can be eliminated by disposing the spur gears 77, 77a vertically rather than horizontally. As such, the plane 80 will constitute a vertical plane and the bearing box 88 will be oriented horizontally.

Zero, normal or minimum play of the input shaft 76 will result when hydraulic or pneumatic fluid pressure is applied to the cylinders 85 to force the pistons 84 toward one another. The limit of piston movement in such direction will be established by abutment between each of the pistons 84 and an interior end wall 87 of each cylinder. To permit the movement of the input shaft 76 as guided by movement of the adjustable bearing 78 within the confines of the aperture 79, pressure is relieved from the cylinders 85.

The input shaft 76 will then move to an alternate plane relative to the plane 80 with the bearing 78 separating from engagement with one of the piston links 96 or 98. Such movement comes about when using frictional clutches, due to the equalization of the different elastic distortions of the power trains in which the clutches 73, 73a are carried. These different distortions are a result of the torque differences due to different frictional characteristics of each clutch when reaching synchronism.

When form locking clutches such as gear or claw clutches are used, the input shaft 76 moves to compensate for the distortion difference in the lay shafts which exists between engagement of the second clutch to be engaged and the final operating state wherein both clutches are engaged and to provide position synchronization for engagement of the primary and secondary parts of the second clutch to be engaged.

In accordance with the invention, the input shaft 76 of the drive pinion 71 is freely movable perpendicular to the plane 80 of the lay shafts 77, 77a during various operating states of the transmission 200.

Pursuant to the method of the present invention, it will be appreciated that when a transmission constructed in accordance with the present invention employs friction clutches, the following tabulation of transmission operating states and corresponding adjustable bearing plays will be employed:

| Transmission Clutch State | Bearing Play |
|---|---|
| I. Operation with clutches disengaged | Minimal, normal or zero play |
| II. During the slip phase of the clutches | Minimal, normal or zero play |
| III. Operation with clutches engaged | Maximum bearing play is permitted for movement of the input shaft relative to the lay shafts |

Once the clutches have engaged and the bearing is adjusted for maximum play, the input shaft is maintained in its position by the engagement between the input pinion and the drive spur gears mounted on each of the lay shafts. Tooth forces and torques through each of the gear trains are equal.

With respect to positive locking clutches such as gear or claw clutches, the following transmission operating states and corresponding bearing states are employed:

| Transmission Clutch State | Bearing Play |
|---|---|
| I. Operation with clutches disengaged | Input shaft and input pinion are supported by the adjustable bearing with zero, normal or minimal play. |
| II. First locking clutch engaged | Normal, minimal or zero play |
| III. During engagement of the remaining second clutch | Increased or maximum bearing play is provided |

It should also be understood that a significant aspect of the present invention resides in the use of different bearing plays on the input shaft to coincide with the different operating states of the clutches of the transmission to equalize torques in all of the lay shaft gear trains so that, with respect to torque distribution, the clutched lay shafts will function in a manner identical to lay shafts without clutches.

Thus, it will be seen that there is provided a clutched multiple branched gear train transmission system and method which achieves the various objects of the invention and which is well suited to meet the conditions of practical usage.

It should be understood that various changes will be readily apparent to those of ordinary skill in the art without departing from the present invention. For example, although the input pinion 71 and the spur gears 72, 72a have been illustrated as straight gears, various alternative gear formations may be employed such as single helical or double helical gear formations. It should be understood, however, that the pinion 71 and the spur gears 72, 72a must have the same type of gear formations for driving engagement. Other readily apparent modifications might include torque distribution over additional lay shaft gear trains.

As various changes might be made in the present invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. A transmission system comprising an input shaft, input gear means, means mounting the input gear means to the input shaft, the input shaft rotating the input gear means, an output gear, a pair of lay shaft gear trains, each lay shaft train including a spur gear, each spur gear being in engagement with the input gear means, each lay shaft train further including pinion means, each lay shaft pinion means being in driving engagement with the output gear, each lay shaft train further including clutch means intermediate the spur gear and the pinion means, the transmission further including adjustable bearing means, the input shaft engaging the adjustable bearing means, the adjustable bearing means including means for selectively varying the bearing play during different stages of clutch operation, the means for varying the bearing play including means for selectively providing a restraintive force inhibiting bearing movement and for selectively relieving the restraintive force to permit increased bearing play.

2. A transmission system constructed in accordance with claim 1 wherein the input gear means is fixed to the input shaft, the adjustable bearing means comprising a thrust bearing.

3. A transmission system constructed in accordance with claim 1 wherein the means for providing the restraintive force includes pump means for providing a pressurized fluid supply and means for controlling the application of such pressurized fluid.

4. A transmission system constructed in accordance with claim 1 further including a pair of reversing lay shaft gear trains, each of the reversing gear trains including a reversing spur gear in driving engagement with a lay shaft train spur gear, each of the reversing gear trains further including a pinion in engagement with the output gear and clutch means intermediate the reversing spur gear and the pinion, the reversing gear train clutch means being disengaged when the output gear is being driven by the lay shaft gear trains and the lay shaft gear train clutch means being disengaged when the output gear is being driven by the reversing gear trains.

5. A transmission system constructed in accordance with claim 2 wherein the means for selectively varying the bearing play includes means for permitting the input shafts to move axially in response to unequal torque distribution between the lay shaft gear trains when the clutch means are engaged, the input shaft moving axially until disposed at a position wherein it is free of axial forces in the direction of bearing play adjustment.

6. A method of operating a transmission system constructed in accordance with claim 1 wherein the clutch means comprises friction clutches, the method including the steps of
 (a) restraining the adjustable bearing means to provide reduced bearing play when the transmission is operating with the friction clutches disengaged to prevent uncontrollable motions,
 (b) entering the slip phase of clutch engagement while continuing to restrain the adjustable bearing means to provide reduced bearing play; and
 (c) relieving the restraint on the adjustable bearing means to permit displacement of the input gear means after the clutches have fully engaged, whereby engagement of the lay shaft gear trains is facilitated while equal torque distribution between the lay shaft gear trains which drive the output gear is achieved.

7. A method of operating a transmission constructed in accordance with claim 6 wherein the adjustable bearing means are restrained by applying a pressurized fluid.

8. A method of operating a transmission system constructed in accordance with claim 1 wherein the clutch means comprises positive locking clutches, the method including the steps of
 (a) restraining the adjustable bearing means to provide reduced bearing play when the transmission is operating with the clutches disengaged,
 (b) engaging the clutch of one of the lay shaft gear trains while continuing to restrain the adjustable bearing means to provide reduced bearing play,
 (c) relieving the restraint on the adjustable bearing means to provide increased bearing play after the one lay shaft gear train clutch has become engaged, and
 (d) engaging the clutch of a further lay shaft gear train while the restraintive force is relieved to facilitate engagement by permitting position synchronization between the components of the clutch being engaged.

9. A transmission system comprising an input shaft, input gear means, means mounting the input gear means to the input shaft, the input shaft rotating the input gear means, an output gear, at least a pair of lay shaft gear trains, each lay shaft train including a spur gear, each spur gear being in engagement with the input gear means, each lay shaft train further including pinion means, each lay shaft pinion means being in driving engagement with the output gear, each lay shaft train further including friction clutch means intermediate the spur gear and the pinion means, the transmission further including adjustable bearing means, the input shaft engaging the adjustable bearing means, the adjustable bearing means including means for selectively
 (a) restraining the adjustable bearing means to provide reduced bearing play when the transmission is operating with the friction clutches disengaged and when entering the slip phase of clutch engagement to prevent uncontrollable motions, and
 (b) relieving the restraint on the adjustable bearing means to permit increased bearing play and to permit displacement of the input gear means corresponding to the increased bearing play after the clutches have fully engaged, whereby engagement of the lay shaft gear trains is facilitated while equal torque distribution between the lay shaft gear trains which drive the output gear is achieved.

10. A transmission system comprising an input shaft, input gear means, means mounting the input gear means to the input shaft, the input shaft rotating the input gear means, an output gear, at least a pair of lay shaft gear trains, each lay shaft train including a spur gear, each spur gear being in engagement with the input gear means, each lay shaft train further including pinion means, each lay shaft pinion means being in driving engagement with the output gear, each lay shaft train further including positive locking clutch means intermediate the spur gear and the pinion means, the transmission further including adjustable bearing means, the input shaft engaging the adjustable bearing means, the adjustable bearing means including means for selectively
 (a) restraining the adjustable bearing means to provide reduced bearing play when the transmission is operating with the clutches disengaged, and
 (b) relieving the restraint on the adjustable bearing means to provide increased bearing play after at least one of the lay shaft gear train clutches has become engaged in facilitate engagement of the respective other lay shaft gear train clutch by permitting position synchronization between the components of the clutch being engaged while equal torque distribution between the lay shaft gear trains which drive the output gear is achieved.

11. A transmission system constructed in accordance with claim 1 wherein the means for selectively varying the bearing play includes means for permitting lateral displacement of the input gear means relative to the axes of the lay shaft gear trains.

12. A transmission system constructed in accordance with claim 11 wherein the means for selectively varying the bearing play includes means for permitting displacement of the input gear means in directions perpendicular to a common plane of the axes of the lay shaft gear trains.

13. A transmission system constructed in accordance with claim 9 wherein the input gear means is fixed to the input shaft, the adjustable bearing means comprising a thrust bearing.

14. A transmission system constructed in accordance with claim 9 wherein the means for selectively varying the bearing play includes means for permitting lateral displacement of the input gear means relative to the axes of the lay shaft gear trains.

15. A transmission system constructed in accordance with claim 10 wherein the input gear means is fixed to the input shaft, the adjustable bearing means comprising a thrust bearing.

16. A transmission system constructed in accordance with claim 10 wherein the means for selectively varying the bearing play includes means for permitting lateral displacement of the input gear means relative to the axes of the lay shaft gear trains.

* * * * *